United States Patent
Yamashita

(10) Patent No.: US 10,489,340 B2
(45) Date of Patent: Nov. 26, 2019

(54) DISTRIBUTED COMPUTING SYSTEM AND DISTRIBUTED PROCESSING METHOD

(71) Applicant: HITACHI, LTD., Tokyo (JP)

(72) Inventor: Ryozo Yamashita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 456 days.

(21) Appl. No.: 15/307,308

(22) PCT Filed: Oct. 30, 2014

(86) PCT No.: PCT/JP2014/078976
§ 371 (c)(1),
(2) Date: Oct. 27, 2016

(87) PCT Pub. No.: WO2016/067426
PCT Pub. Date: May 6, 2016

(65) Prior Publication Data
US 2017/0046305 A1 Feb. 16, 2017

(51) Int. Cl.
*G06F 15/167* (2006.01)

(52) U.S. Cl.
CPC .................... *G06F 15/167* (2013.01)

(58) Field of Classification Search
CPC ............ H04L 64/1002; H04L 64/1097; H04L 64/1095; H04L 51/20; H04L 51/32; H04L 49/552; H04L 49/557; H04L 49/602
USPC ......................................... 709/206, 221–223
See application file for complete search history.

(56) References Cited

U.S. PATENT DOCUMENTS

| | | | |
|---|---|---|---|
| 9,274,863 B1* | 3/2016 | Qiu ..................... | G06F 11/1474 |
| 2005/0149609 A1* | 7/2005 | Lamport ................ | G06F 9/542 |
| | | | 709/200 |
| 2005/0198106 A1 | 9/2005 | Lamport | |
| 2006/0136781 A1 | 6/2006 | Lamport | |
| 2007/0124342 A1 | 5/2007 | Yamamoto et al. | |

(Continued)

FOREIGN PATENT DOCUMENTS

| JP | 2005-196763 A | 7/2005 |
|---|---|---|
| JP | 2006-155614 A | 6/2006 |

(Continued)

OTHER PUBLICATIONS

Leslie Lamport, "The Part-Time Parliament", ACM Transactions on Computer Systems, vol. 16, No. 2 on pp. 133-169, dated May 1998.

(Continued)

*Primary Examiner* — Farzana B Huq
(74) *Attorney, Agent, or Firm* — Volpe and Koenig, P.C.

(57) ABSTRACT

In a distributed computing system, a master transmits a prepare request including a proposal number to a slave. When the proposal number included in the prepare request does not exist in management information, the slave sends back a prepare response including a new identifier associated with the proposal number to the master. The master transmits a write request including the identifier and a proposal to the slave. The slave writes the proposal into a memory area associated with the identifier included in the write request received from the master and, when writing is a success, sends back a write success response. The master determines that the slave having sent back the write success response has consented to the proposal.

7 Claims, 8 Drawing Sheets

(56) References Cited

U.S. PATENT DOCUMENTS

2012/0254287 A1    10/2012   Watanabe
2017/0366451 A1*   12/2017   Schreter .................. H04L 45/28

FOREIGN PATENT DOCUMENTS

JP       2012-033108 A    2/2012
WO    2007/063944 A1   6/2007

OTHER PUBLICATIONS

InfiniBand Trace Association, "InfiniBand Architecture Specification", vol. 1, Release 1.2.1.
Patrick Hunt, Mahadev Konar, Flavio P. Junqueria, Benjamin Reed, "ZooKeeper: wait-free coordination for internet-scale systems", In Proceedings of the 2010 USENIX conference on USENIX Annual Technological Conference Diego Ongaro, John Ousterhout, "In Search of an Understandable Consensus Algorithm", In Proceeding of the 2014 USENIX conference on USENIX Annual Technological Conference.

* cited by examiner

Fig. 3

| Proposal number management table 1445 |||| |
| 14451 | 14452 | 14453 | 14454 |
| Sequence number | Proposal number | R_KEY | Memory size |
| 1 | 1 | 0x423a2 | 100 |
| ... | ... | ... | ... |

| Write destination management table 1449 ||
| 14491 | 14492 |
| Node ID | R_KEY |
| B | 0x423a2 |
| C | 0x15e7f |

14490

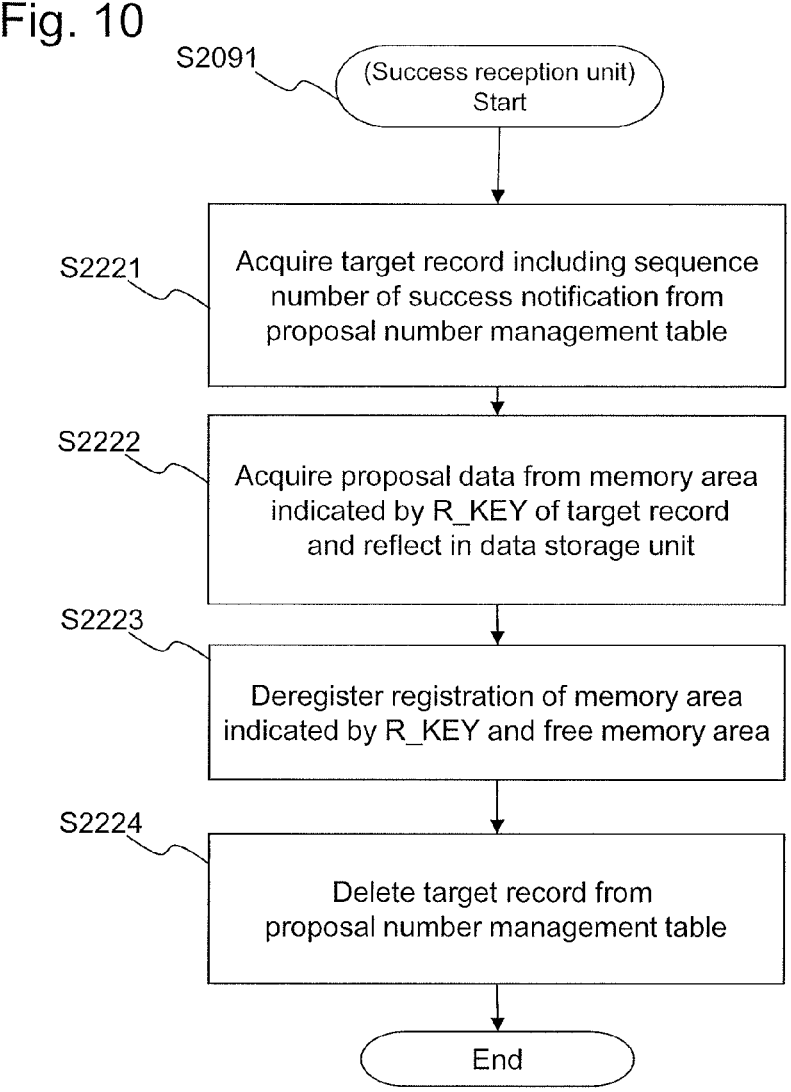

DISTRIBUTED COMPUTING SYSTEM AND DISTRIBUTED PROCESSING METHOD

TECHNICAL FIELD

The present invention relates to a technique relating to a distributed computing system and a distributed processing method.

BACKGROUND ART

NPL 1 discloses a protocol named Paxos which uses a distributed consensus algorithm. Paxos is a protocol which, when a voting process is performed among computers and a consensus is built by a quorum (in many cases, a majority is assumed) or more, a result is finalized with respect to all computers. Accordingly, even when consent is not obtained from all computers, a result can be finalized if consent is obtained from a quorum or more. In addition, PTL 1 describes a distributed computing system which considers and utilizes exchangeable commands in a Paxos algorithm in order to introduce a smaller message delay between reception of a request from a client and transmission of a response to the client. Furthermore, NPL 2 discloses a technique of RDMA (remote direct memory access) for performing a DMA transfer from a memory of a certain computer to a memory of a different remote computer.

CITATION LIST

Patent Literature

[PTL 1]
Japanese Patent Application Publication No. 2006-155614

Non Patent Literature

[NPL 1]
Leslie Lamport, "The Part-Time Parliament", ACM Transactions on Computer Systems, volume 16, number 2 on pages 133-169, dated May 1998
[NPL 2]
InfiniBand Trace Association, "InfiniBand Architecture Specification, Volume 1, Release 1.2.1"
[NPL 3]
Patrick Hunt, Mahadev Konar, Flavio P. Junqueira, Benjamin Reed, "ZooKeeper: wait-free coordination for internet-scale systems", In Proceedings of the 2010 USENIX conference on USENIX annual technical conference
[NPL 4]
Diego Ongaro, John Ousterhout, "In Search of an Understandable Consensus Algorithm", In Proceeding of the 2014 USENIX conference on USENIX Annual Technical Conference

SUMMARY OF INVENTION

Technical Problem

In conventional Paxos, a master computer (a computer of a master) transmits a proposal to a plurality of slave computers (computers of slaves) and determines whether or not a consensus has been built with respect to the proposal based on votes (responses) from the slave computers. In this case, the master computer must stand by until a response is transmitted by each slave computer. Therefore, the time required by the master computer to determine whether or not a consensus has been built is at least equal to or longer than the standby time. In consideration thereof, an object of the present invention is to reduce the time required for reaching a consensus in a distributed computing system and a distributed processing method related to a distributed consensus algorithm.

Solution to Problem

A distributed computing system according to an embodiment includes a plurality of mutually network-coupled computers and the respective computers operate in cooperation with each other.

A first computer transmits a prepare request which is a request to prepare a proposal and which includes a proposal ID, to a second computer. In addition, when the first computer receives a prepare response which is a response to the prepare request and which includes a memory area ID from the second computer, the first computer transmits a write request which is a request to write the proposal and which includes the proposal and the memory area ID in the prepare response to the second computer. Furthermore, when the first computer receives a write success response which is a response to the write request and which indicates a write success from the second computer, the first computer determines that the second computer has consented to the proposal.

When the proposal ID in the prepare request received from the first computer does not exist in management information representing a correspondence between a proposal ID and a memory area ID, the second computer registers a pair including the proposal ID in the prepare request and a new memory area ID in the management information and sends back a prepare response including the proposal ID in the prepare request and the new memory area ID. In addition, when the memory area ID in the write request received from the first computer exists in the management information, the second computer writes the proposal in the received write request in a memory area identified from the memory area ID and sends back a write success response to the first computer.

Advantageous Effects of Invention

According to the present invention, the time required for reaching a consensus can be reduced in a distributed computing system and a distributed processing method related to a distributed consensus algorithm.

BRIEF DESCRIPTION OF DRAWINGS

FIG. 3 shows a configuration example of a proposal number management table.
FIG. 4 shows a configuration example of a write destination management table.

FIG. 10 is a flow chart showing details of a process example in which a success reception unit of a slave reflects proposal data.

DESCRIPTION OF EMBODIMENTS

Hereinafter, an embodiment will be described. Although information will be described below using expressions such as an "xxx table", an "xxx queue", and an "xxx list", information may be expressed using any kind of data structure. In other words, an "xxx table", an "xxx queue", or an "xxx list" can also be referred to as "xxx information" in order to show that information is not dependent on data structure. In the following description, since a computer program (hereinafter referred to as a "program") causes prescribed processing to be performed while using at least one of a storage resource (for example, a memory) and a communication interface device as appropriate by being executed by a processor (for example, a CPU (central processing unit)), a processor or an apparatus including the processor may be considered a subject of processing. Processing performed by a processor may be partially or entirely performed by a hardware circuit. A program may be installed from a program source. The program source may be a program distribution node or a storage medium (for example, a portable storage medium).

In the following description, when describing elements of a same type while distinguishing the elements from one another, reference signs such as a "node 100A" and a "node 100B" may be used. However, when describing elements of a same type without distinguishing the elements from one another, only a shared number among the reference signs such as a "node 100" may be used.

Figure 1:
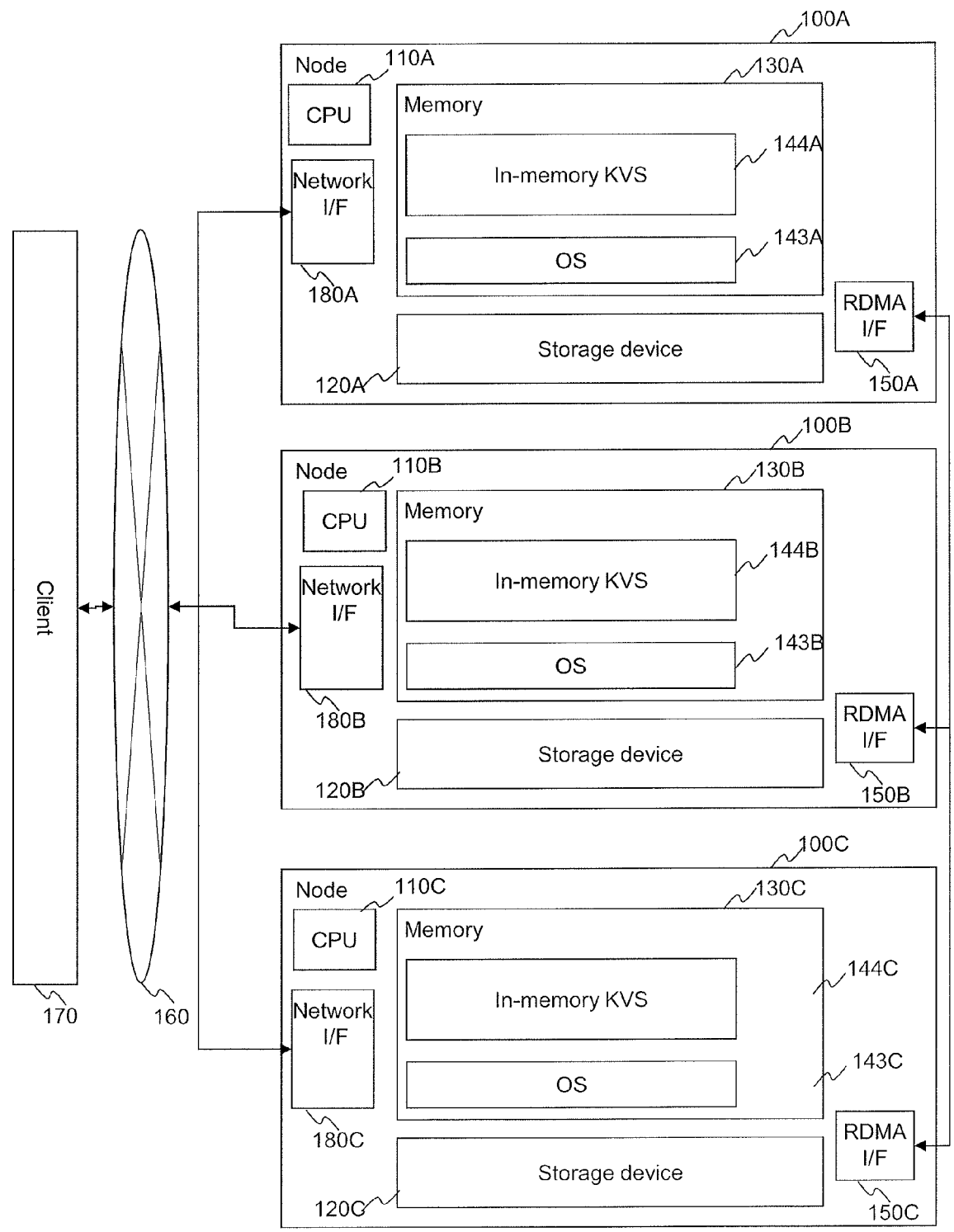
FIG. 1 shows a configuration of a distributed computing system according to an embodiment.

FIG. 1 shows a configuration of a distributed computing system according to an embodiment.

In the distributed computing system, a plurality of nodes 100A, 100B, and 100C constitute a cluster. A client 170 and each of the nodes 100A, 100B, and 100C are coupled by a network 160. The client and the nodes represent types of computers. Examples of the network 160 include a SAN (storage area network), a LAN (local area network), and a WAN (wide area network).

The node 100 includes a CPU 110, a storage device 120, a memory 130, a network I/F 180, and an RDMA I/F 150.

The network I/F 180 is an I/F for coupling the node 100 to the network 160. Examples of the network I/F 180 include an Ethernet (registered trademark) adapter and a Fibre Channel adapter.

The RDMA I/F 150 is an I/F for realizing an RDMA transfer. An RDMA transfer refers to performing a DMA transfer between one's own node and a remote node. For example, when data is transferred by RDMA from an RDMA I/F 150A of the node 100A to an RDMA I/F 150B of a remote node 100B, the RDMA I/F 150B directly stores the transferred data in a memory 130B. In this case, a CPU 110B of the remote node 100B need not perform processing. Accordingly, a processing load on the CPU is reduced. The RDMA I/Fs 150 may be coupled to each other via the network 160 or may be coupled to each other by a network other than the network 160 or by a cable or the like.

The storage device 120 is a device for storing data. Examples of the storage device 120 include an HDD (hard disk drive), an SSD (solid state device), and a flash memory drive.

The memory 130 is a device for storing programs, data, and the like. The memory 130 stores an OS 143 that is a type of program, an in-memory KVS (key value store) 144, and the like. Examples of the memory 130 include a DRAM (dynamic random access memory), an MRAM (magnetic random access memory), and a FeRAM (ferroelectric random access memory).

The CPU 110 processes programs and data stored in the memory 130. The CPU 110 processes transmission and reception of data via the network I/F 180. Various functions included in the distributed computing system are realized by processing performed by the CPU 110 of each node 100.

The in-memory KVS 144 constructs a key value store on the memory 130 and manages and controls the key value store. The in-memory KVS 144 may be an in-memory distributed KVS which manages data by distributing the data over a plurality of nodes 100.

Figure 2:
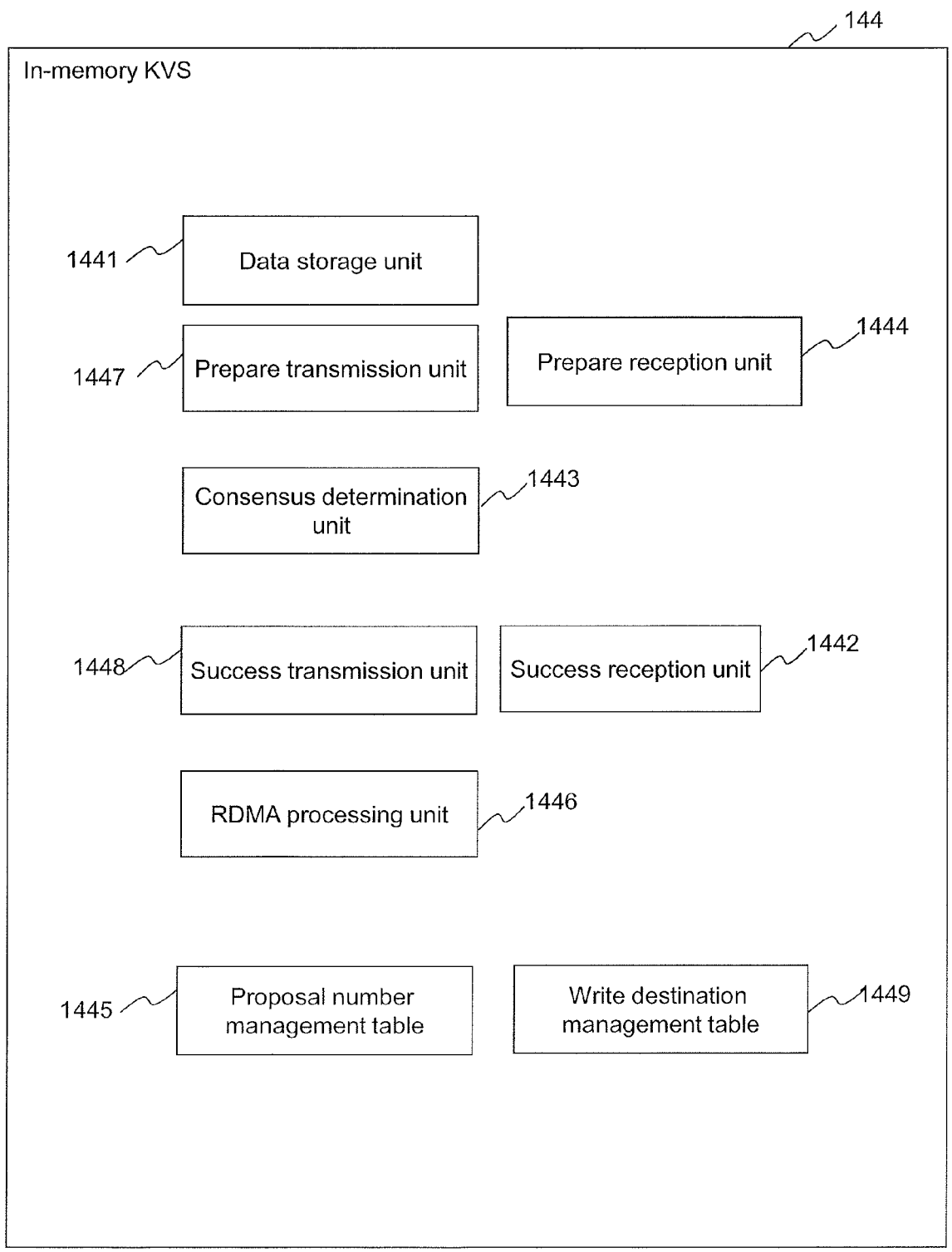
FIG. 2 shows an example of functions of an in-memory KVS.

FIG. 2 shows an example of functions of the in-memory KVS 144.

With respect to a proposal transmitted from the client 170, the distributed computing system determines whether or not a consensus has been built based on the Paxos protocol. Hereinafter, in the Paxos protocol, a node that acts as a master may be referred to as a "master node" and a node that acts as a slave may be referred to as a "slave node". The node 100 that acts as a master and the node 100 that acts as a slave are not fixed and may differ from time to time.

As functions of the in-memory KVS 144, the node 100 includes a prepare transmission unit 1447, a prepare reception unit 1444, a consensus determination unit 1443, a success transmission unit 1448, a success reception unit 1442, and an RDMA processing unit 1446. In addition, the in-memory KVS 144 manages a data storage unit 1441, a proposal number management table 1445, and a write destination management table 1449. The tables 1445 and 1449 are stored in, for example, the memory 130.

The data storage unit 1441 stores proposal data transmitted from the client 170. In this case, a consensus has been built in the entire distributed computing system with respect to proposal data to be stored in the data storage unit 1441. Proposal data for which a consensus has not been built in the entire distributed computing system is not stored in the data storage unit 1441.

The prepare transmission unit 1447 is executed by the master node 100 (in other words, executed when the node 100 including the in-memory KVS 144 is the master node 100) and transmits a prepare request to the slave node 100 via the network I/F 180. The prepare request includes at least a sequence number and a proposal number. A sequence number is information for identifying a series of consensus building processes. A different sequence number means that a processing target of consensus building differs. Specifically, when a consensus has been built in the entire distributed computing system and the proposal data is reflected in the data storage unit 1441 of each node 100, processing of the sequence number is completed.

A proposal number is information for identifying proposal data and also for identifying which proposal data is new. The larger the proposal number, the newer the proposal data. Details of a sequence number and a proposal number will be given later. In addition, while numbers are adopted as IDs for both sequences and proposal data in the present embodiment, identification information (for example, the alphabet) of a type which enables determination of old and new with respect to sequences and proposal data may be adopted as a sequence ID or a proposal ID.

The prepare reception unit 1444 is executed by the slave node 100 (in other words, executed when the node 100 including the in-memory KVS 144 is the slave node 100) and receives a prepare request from the master node 100 via the network I/F 180. Subsequently, the prepare reception unit 1444 performs processing related to the prepare request. In addition, the prepare reception unit 1444 sends back a prepare response including a result of processing related to the prepare request to the master node 100 via the network I/F 180. A prepare success response in a case where processing related to the prepare request is a success includes an ID (hereinafter, referred to as an "R-KEY") of a memory area associated with the proposal number included in the prepare request. Details of an R_KEY will be given later. A prepare failure response in a case where processing related to the prepare request is a failure includes information indicating the failure.

For example, when a record having a proposal number included in the prepare request does not exist in the proposal number management table 1445, the prepare reception unit 1444 secures a new memory area. In addition, the prepare reception unit 1444 registers a record associating the proposal number, the new memory area, and an R_KEY indicating the new memory area with each other in the proposal number management table 1445. Subsequently, the prepare reception unit 1444 sends back the prepare success response including the R_KEY indicating the new memory area to the master node 100. When the prepare transmission unit 1447 of the master node 100 receives the prepare response, the prepare transmission unit 1447 may register a record associating a node ID indicating the node (slave) 100 that is a transmission source of the prepare response and the R_KEY included in the prepare response with each other in the write destination management table 1449.

For example, when a record having the sequence number included in the prepare request exists in the proposal number management table 1445 and, at the same time, the proposal number included in the prepare request is equal to or smaller than a proposal number of the record having the sequence number in the proposal number management table 1445, the prepare reception unit 1444 sends back a prepare failure response including the proposal number of the record having the sequence number to the master node 100.

For example, when a record having the sequence number included in the prepare request exists in the proposal number management table 1445 and, at the same time, the proposal number included in the prepare request is larger than a proposal number of the record having the sequence number in the proposal number management table 1445, the prepare reception unit 1444 executes the following processes. Specifically, the prepare reception unit 1444 determines whether or not a proposal has already been written in a memory area associated with the proposal number. As will be described later, the proposal data is written into the memory area by an RDMA transfer from the master node 100.

When proposal data has already been written in the memory area, the prepare reception unit 1444 sends back a prepare failure response including the proposal data in the memory area to the master node 100.

When proposal data has not yet been written in the memory area, the prepare reception unit 1444 secures a new memory area, registers a new record in the proposal number management table 1445, and sends back a prepare success response to the master node 100 in a similar manner to the case described earlier where a record having the proposal number included in the prepare request does not exist in the proposal number management table 1445.

The RDMA processing unit 1446 is executed by the master node 100 and transmits proposal data to a plurality of slave nodes 100 using an RDMA transfer. Specifically, the RDMA processing unit 1446 acquires an R_KEY corresponding to the slave node 100 that is an RDMA transfer destination from the write destination management table 1449. In addition, the RDMA processing unit 1446 transfers proposal data by RDMA (RDMA SEND) to a memory area indicated by the R_KEY of the slave node 100 via the RDMA I/F 150. A write success response or a write failure response to the RDMA transfer is stored in a completion queue that is managed by the RDMA I/F 150 of the master node 100.

The consensus determination unit 1443 is executed by the master node 100 and determines whether or not a consensus has been built with respect to proposal data based on votes from the respective slave nodes 100. For example, the consensus determination unit 1443 determines that a consensus has been built with respect to proposal data when a vote of "consent" is obtained from a quorum (for example, a majority) or more of the slave nodes 100 among the plurality of slave nodes 100. The consensus determination unit 1443 according to the present embodiment determines whether or not a consensus has been built based on a write response to an RDMA transfer from the slave nodes 100 to the master node 100. For example, this determination is made as follows.

When the RDMA I/F 150 of the slave node 100 receives an RDMA transfer of proposal data from the RDMA I/F 150 of the master node 100, the RDMA I/F 150 of the slave node 100 performs a write process of the proposal data with respect to a memory area indicated by the R_KEY. The RDMA I/F 150 of the slave node 100 sends back, to the RDMA I/F 150 of the master node 100, a write success response when writing of the proposal data is a success and a write failure response when the writing is a failure. Specifically, the RDMA I/F 150 of the slave node 100 writes a write success response or a write failure response into a completion queue managed by the RDMA I/F 150 of the master node 100. The consensus determination unit 1443 determines that a slave node 100 having sent back a write success response has "consented" to the proposal data and that a slave node 100 having sent back a write failure response has "not consented" to the proposal data. In other words, when a write success response with respect to the RDMA transfer is sent back from a quorum or more of the slave nodes 100, the consensus determination unit 1443 determines that a consensus has been built with respect to the proposal data transferred by RDMA.

Moreover, when a write response to the RDMA transfer is not received within a prescribed time from the slave node 100, the consensus determination unit 1443 determines that the RDMA transfer to the slave node 100 has failed. In this case, the master node 100 may once more perform an RDMA transfer to the slave node 100.

The success transmission unit 1448 is executed by the master node 100 and, when a consensus is built with respect to proposal data by the consensus determination unit 1443, the success transmission unit 1448 reflects the proposal data in the data storage unit 1441. In addition, the success transmission unit 1448 transmits a success notification to each slave node 100 via the network I/F 180. The success notification includes a sequence number corresponding to the proposal data on which a consensus has been built.

The success reception unit 1442 is executed by the slave node 100 and, upon receiving a success notification from the master node 100 via the network I/F 180, executes the following process. Specifically, the success reception unit 1442 extracts an R_KEY corresponding to a sequence number included in a success notification from the proposal number management table 1445. In addition, the success reception unit reads proposal data from a memory area indicated by the R_KEY and reflects the proposal data in the data storage unit 1441. Accordingly, the proposal data on which a consensus has been built in the consensus determination unit 1443 is reflected in all nodes 100.

FIG. 3 shows a configuration example of the proposal number management table 1445.

The proposal number management table 1445 is a table for managing a correspondence between a proposal number and a memory area with respect to an RDMA transfer and is stored in the slave node 100. The proposal number management table 1445 has a plurality of records, and each record includes a sequence number 14451, a proposal number 14452, an R_KEY 14453, and a memory size 14454 as field values.

The sequence number 14451 is information for identifying a series of consensus building processes. A different sequence number means that a target of consensus building differs.

The proposal number 14452 is information for identifying proposal data and also for identifying which proposal data is new. The larger the proposal number 14452, the newer the proposal data. Even when the proposal number 14452 is the same, a different sequence number 14451 indicates different proposal data.

The R_KEY 14453 is an ID of a memory area for RDMA. For example, the R_KEY 14453 may include a memory address itself or may be information including a memory address. The memory size 14454 is information indicating a size of the memory area indicated by the R_KEY 14453.

In the proposal number management table 1445 shown in FIG. 3, a record 14450 indicates that a memory area indicated by the R_KEY 14453 "0x4213a2" is associated with the proposal number 14452 "1" of the sequence number 14451 "1" and that the size 14454 of the memory area is "100".

The proposal number management table 1445 is updated based on a prepare request received by the prepare reception unit 1444 of the slave node 100 from the master node 100. As described earlier, a case where the prepare reception unit 1444 secures a new memory area and registers a record including the R_KEY 14453 indicating the new memory area in the proposal number management table 1445 is any of the following cases.
(1) When a record having a proposal number included in a prepare request does not exist in the proposal number management table 1445.
(2) When a record having a sequence number included in a prepare request exists in the proposal number management table 1445 and, at the same time, a proposal number included in the prepare request is larger than the proposal number 14452 of the record having the sequence number in the proposal number management table 1445 and proposal data is not yet written in the memory area.

Therefore, an R_KEY of proposal data transferred by RDMA from the master node 100 not existing in the proposal number management table 1445 means that the proposal data does not fall under either (1) or (2) described above. In addition, in this case, since the memory area indicated by the R_KEY has not been secured, the RDMA I/F 150 of the slave node 100 sends back a write failure response to the master node 100. Therefore, the RDMA processing unit 1446 of the master node 100 can determine that the slave node 100 has "not consented" based on the write failure response to the RDMA transfer.

In contrast, an R_KEY of proposal data transferred by RDMA from the master node 100 existing in the proposal number management table 1445 means that the proposal data falls under any of (1) and (2) described above. In addition, in this case, since the memory area indicated by the R_KEY has been secured, the RDMA I/F 150 of the slave node 100 sends back a write success response to the master node 100. Therefore, the RDMA processing unit 1446 of the master node 100 can determine that the slave node 100 has "consented" based on the write success response to the RDMA transfer.

In other words, by associating a proposal number and a memory area with respect to an RDMA transfer with each other in the proposal number management table 1445, the master node 100 can determine whether or not the slave node 100 has consented with respect to the proposal number based on a success or failure of the RDMA transfer. Accordingly, the time required for consensus building in the entire distributed computing system can be reduced.

FIG. 4 shows a configuration example of the write destination management table 1449.

The write destination management table 1449 is a table for managing a correspondence between a node 100 that is a write destination of an RDMA transfer and a memory area of the node 100 and is stored in the master node 100. The write destination management table 1449 has a plurality of records, and each record includes a node ID 14491 and an R_KEY 14492 as field values.

The node ID 14491 is information for identifying a node. The R_KEY 14492 indicates a memory area that is a write destination of an RDMA transfer in the node indicated by the node ID.

In the write destination management table 1449 shown in FIG. 4, a record 14490 indicates that a memory area indicated by the R_KEY 14492 "0x4213a2" is associated with the node 100 with the node ID 14491 "B". For example, the RDMA processing unit 1446 refers to the record 14490 and executes an RDMA transfer of proposal data to the memory area indicated by the R_KEY 14492 "0x4213a2" in the node with the node ID "B".

Figure 5:
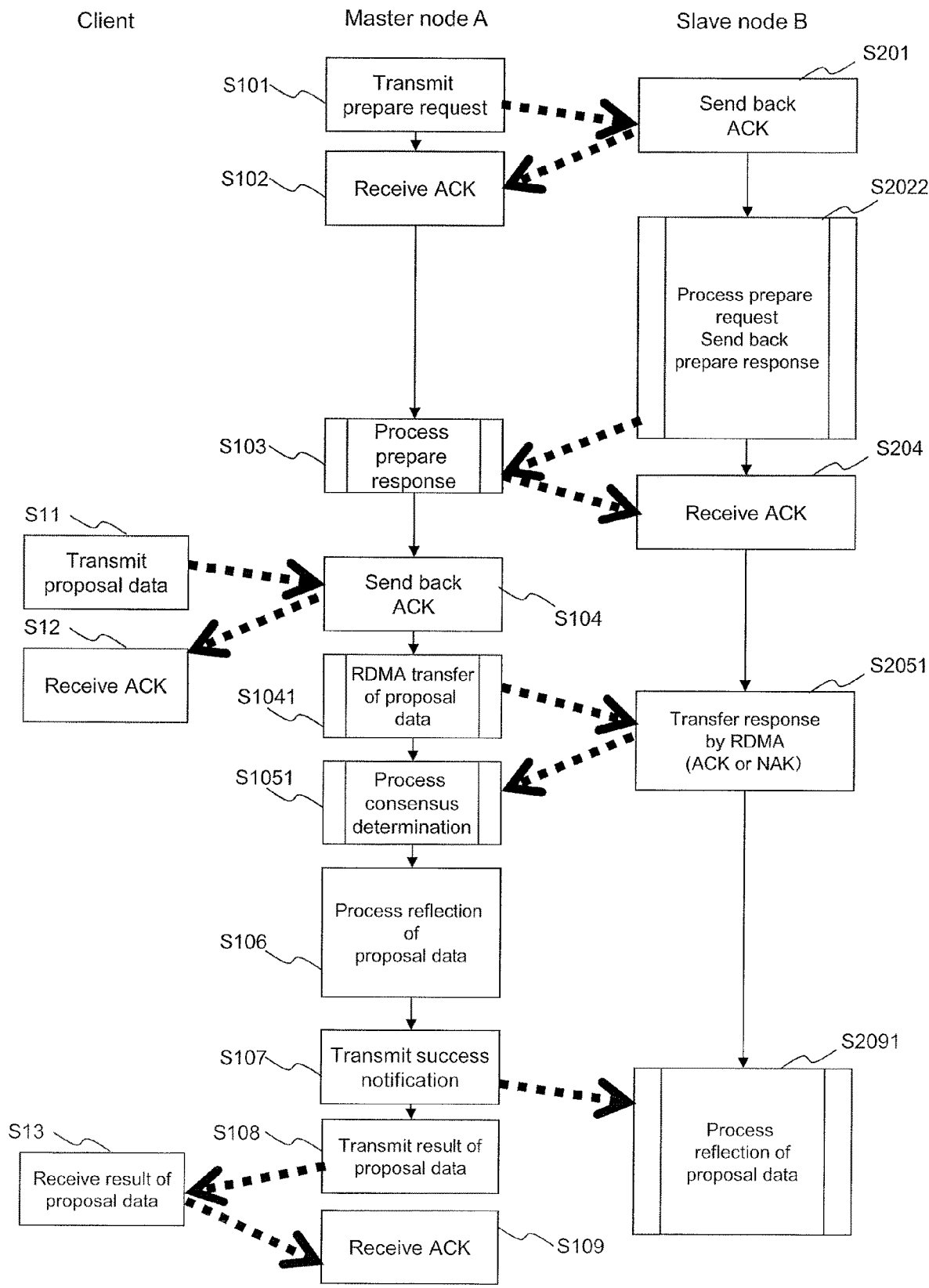
FIG. 5 is a sequence chart showing an outline of a consensus building process in a distributed computing system.

FIG. 5 is a sequence chart showing an outline of a consensus building process in a distributed computing system.

Hereinafter, while a description will be given assuming that a node 100A is a master node and a node 100B is a slave node, the master node 100A performs similar processing with respect to other slave nodes 100 (for example, 100C).

The prepare transmission unit 1447 of the master node 100A transmits a prepare request to the slave node 100B via a network I/F at a prescribed opportunity (S101). When an OS 143B of the slave node 100B receives the prepare request, the OS 143B sends back an ACK to the master node 100A (S201). The prepare transmission unit 1447 of the master node 100A receiving the ACK determines that transmission of the prepare request has succeeded (S102).

The prepare reception unit 1444 of the slave node 100B executes a process related to the prepare request and sends back a prepare response to the master node 100A via a network I/F 180B (S2022). Details of this process will be provided later (refer to FIG. 6).

The prepare transmission unit 1447 of the master node 100A performs a process related to the prepare response sent back from the slave node 100B (S103). Details of this process will be provided later. In addition, when an OS 143A of the master node 100A receives the prepare response, the OS 143A sends back an ACK to the slave node 100B. The slave node 100B receiving the ACK determines that transmission of the prepare response has succeeded (S204).

The client 170 transmits proposal data to the master node 100A (S11). When the master node 100A receives the proposal data, the master node 100 sends back an ACK to the client 170 (S104). The client 170 receiving the ACK determines that transmission of the proposal data has succeeded (S12).

The RDMA processing unit 1446 of the master node 100A having received the proposal data transfers the proposal data by RDMA to each of the plurality of slave nodes 100B, 100C, . . . (S1041). Details of this process will be provided later (refer to FIG. 7).

The RDMA I/F 150B of the slave node 100B writes the proposal data transferred by RDMA from the master node 100A into a memory area indicated by the R_KEY. Subsequently, the RDMA I/F 150B stores, in a completion queue of a memory 130B of the slave node 100B and a completion queue of a memory 130A of the master node 100A, a write success response when writing is a success and a write failure response when writing is a failure (S2051). Specifically, a write response with respect to the RDMA transfer of proposal data from each of the plurality of slave nodes 100B, 100C, . . . is stored in the completion queue of the memory 130A of the master node 100A.

The consensus determination unit 1443 of the master node 100A determines whether or not a consensus has been built in the entire distributed computing system based on the number of write success responses stored in the completion queue of the memory 130A (S1051). Details of this process will be provided later (refer to FIG. 9). Hereinafter, a case where the consensus determination unit 1443 determines that a consensus has been built will be described.

When it is determined that a consensus has been built, the success transmission unit 1448 of the master node 100A stores the proposal data received from the client 170 in S104 in the data storage unit 1441 (S106). In addition, the success transmission unit 1448 of the master node 100A transmits, via the network I/F 180A, a success notification to each of the plurality of slave nodes 100B, 100C, having sent back a write success response (S107).

When the success reception unit 1442 of the slave node 100B receives the success notification from the master node 100A, the success reception unit 1442 of the slave node 100B reflects the proposal data written into a memory area indicated the R_KEY by the RDMA transfer in the data storage unit 1441 (S2091). Details of this process will be provided later (refer to FIG. 10).

The master node 100A sends back a processing result with respect to the proposal data to the client 170 via the network I/F 180A (S108). The processing result may include information indicating whether or not the proposal data has been accepted by the distributed computing system (in other words, whether or not a consensus has been built).

When the client 170 receives the processing result with respect to the proposal data from the master node 100A, the client 170 sends back an ACK to the master node 100A (S13). The master node 100A having received the ACK determines that transmission of the processing result with respect to the proposal data has succeeded (S109).

Figure 6:
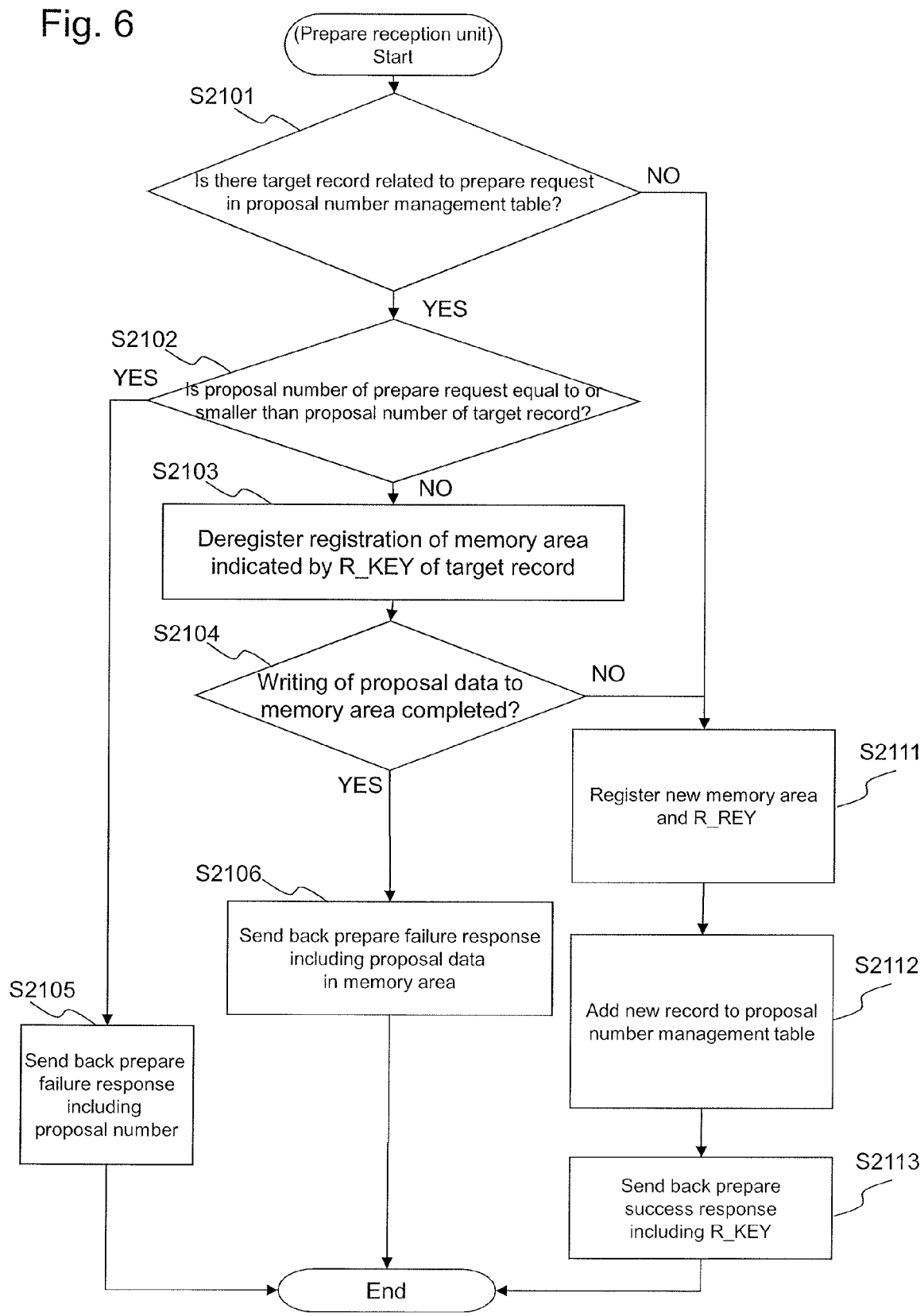
FIG. 6 is a flow chart showing details of a process example related to a prepare request by a prepare reception unit of a slave.

FIG. 6 is a flow chart showing details of a process example related to a prepare request by the prepare reception unit 1444 of the slave node 100B. The present process corresponds to the process of S2022 in FIG. 5.

When the prepare reception unit 1444 receives a prepare request from the master node 100A, the prepare reception unit 1444 performs the following process. The prepare reception unit 1444 determines whether or not there is a record of which the sequence number 14451 matches a sequence number included in the prepare request (referred to as a "target record" in the description of FIG. 6) in the proposal number management table 1445 (S2101). When a result of the determination is positive (S2101: yes), the process advances to S2102, but when a result of the determination is negative (S2101: no), the process advances to S2111.

First, a case where there is no target record (S2101: no) will be described. The prepare reception unit 1444 secures and registers a new memory area for RDMA and acquires an R_KEY indicating the new memory area (S2111). The process of securing and registering a new memory area for RDMA and a process of associating an R_KEY with the new memory area may be performed by the RDMA I/F 150B. A size of the new memory area may be configured by a manager or the like in advance.

In addition, the prepare reception unit 1444 adds a new record to the proposal number management table 1445. The new records includes the sequence number and the proposal number included in the prepare request, the R_KEY acquired in S2111, and a memory size of the new memory area indicated by the R_KEY (S2112).

Furthermore, the prepare reception unit 1444 sends back a prepare success response including the R_KEY acquired in S2111 to the master node 100A (S2113), and ends the present process.

Next, a case where there is a target record (S2101: yes) will be described. The prepare reception unit 1444 determines whether or not the proposal number included in the prepare request (a proposal number X) is equal to or smaller than the proposal number 14452 (a proposal number Y) of the target record (S2102).

When the proposal number X is equal to or smaller than the proposal number Y (S2102: yes), the prepare reception unit 1444 performs the following process. Specifically, the prepare reception unit 1444 sends back a prepare failure response including the proposal number 14452 of the target record to the prepare transmission unit 1447 of the master node 100A (S2105), and ends the present process. This is because the proposal number X being equal to or smaller than the proposal number Y means that the proposal number X is either older than or the same as the proposal number Y received earlier.

When the proposal number X is larger than the proposal number Y (S2102: no), the prepare reception unit 1444 performs the following process. Specifically, the prepare reception unit 1444 deregisters the registration of the memory area indicated by the R_KEY 14453 included in the target record (S2103). The deregistration of the registration of the memory area may be performed by the RDMA I/F 150B.

In addition, the prepare reception unit 1444 determines whether or not writing of proposal data by an RDMA transfer has been completed with respect to the memory area indicated by the R_KEY 14453 (S2104). For example, the prepare reception unit 1444 may make this determination by referring to its own completion queue.

When writing of proposal data has been completed with respect to the memory area indicated by the R_KEY 14453 (S2104: yes), the prepare reception unit 1444 sends back a prepare failure response including the proposal data in the memory area indicated by the R_KEY 14453 to the master node 100A (S2106). Subsequently, the prepare reception unit 1444 ends the present process.

When writing to the memory area indicated by the R_KEY 14453 has not been completed (S2104: no), the prepare reception unit 1444 advances to the process of S2111 described earlier. In other words, in this case, the prepare reception unit 1444 sends back a prepare success response to the master node 100A. This is because no proposal data is to be further written into the memory area and, accordingly, the slave node 100B should consent to a newer proposal number.

Figure 7:
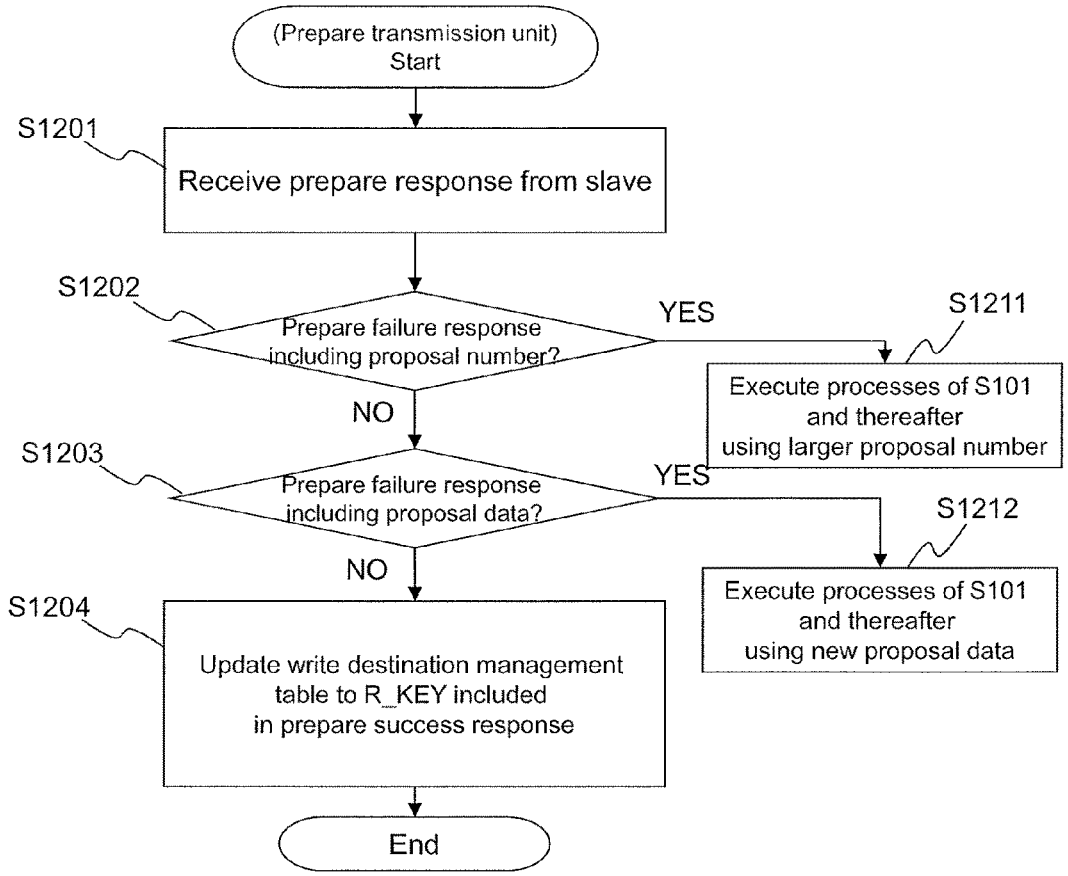
FIG. 7 is a flow chart showing details of a process example related to a prepare response by a prepare transmission unit of a master.

FIG. 7 is a flow chart showing details of a process example related to a prepare response by the prepare transmission unit 1447 of the master node 100A. The present process corresponds to the process of S103 in FIG. 5.

When the prepare transmission unit 1447 of the master node 100A receives a prepare response from the slave node 100B (S1201), the prepare transmission unit 1447 performs the following process. The prepare transmission unit 1447 determines whether or not the prepare response is a prepare failure response including a proposal number (S1202).

When the prepare response is a prepare failure response including a proposal number (S1202: yes), the prepare transmission unit 1447 once again performs the processes of S101 and thereafter shown in FIG. 5 using a proposal number that is larger than the proposal number included in the prepare failure response (S1211). Accordingly, the prepare transmission unit 1447 of the master node 100A is informed of the proposal number to be included in a next prepare request.

When the prepare response is not a prepare failure response including a proposal number (S1202: no), the prepare transmission unit 1447 performs the following process. Specifically, the prepare transmission unit 1447 determines whether or not the prepare response is a prepare failure response including proposal data (S1203).

When the prepare response is a prepare failure response including proposal data (S1203: yes), the prepare transmission unit 1447 once again performs the processes of S101 and thereafter shown in FIG. 5 using the proposal data included in the prepare failure response (S1212). Accordingly, the master node 100A can also reflect the proposal data written into the slave node 100B in other slave nodes.

When the prepare response is not a prepare failure response including proposal data (S1203: no) or, in other words, when the prepare response is a prepare success response including an R_KEY, the prepare transmission unit 1447 performs the following process. Specifically, the prepare transmission unit 1447 updates the R_KEY 14492 corresponding to the node ID 14491 of the slave node 100B having transmitted the prepare response in a write destination management table 1449A to the R_KEY included in the prepare success response (S1204). Subsequently, the prepare transmission unit 1447 ends the present process.

Figure 8:
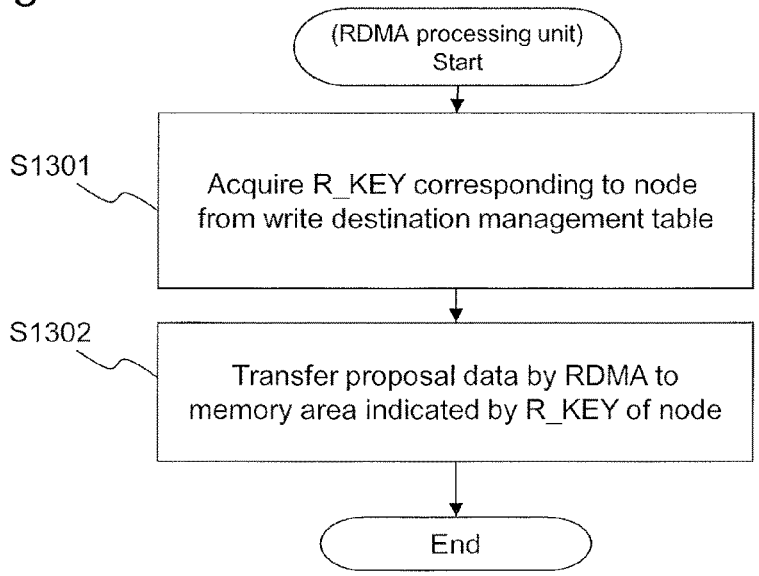
FIG. 8 is a flow chart showing details of a process example in which an RDMA processing unit of a master transfers proposal data to each slave node by RDMA.

FIG. 8 is a flow chart showing details of a process example in which the RDMA processing unit 1446 of the master node 100A transfers proposal data to each slave node 100 by RDMA. The present process corresponds to the process of S1041 in FIG. 5. Hereinafter, a slave node that is an RDMA transfer destination is assumed to be the slave node 100B.

When the RDMA processing unit 1446 of the master node 100A receives proposal data from the client 170, the RDMA processing unit 1446 performs the following process. The RDMA processing unit 1446 acquires the R_KEY 14492 from a record including the node ID 14491 "B" in the write destination management table 1449 (S1301).

Subsequently, the RDMA processing unit 1446 transfers, by RDMA, the proposal data received from the client 170 to a memory area indicated by the acquired R_KEY 14492 (S1302). For example, the RDMA processing unit 1446 issues an indication of "RDMA Write with Immediate" to the RDMA I/F 150A.

Figure 9:
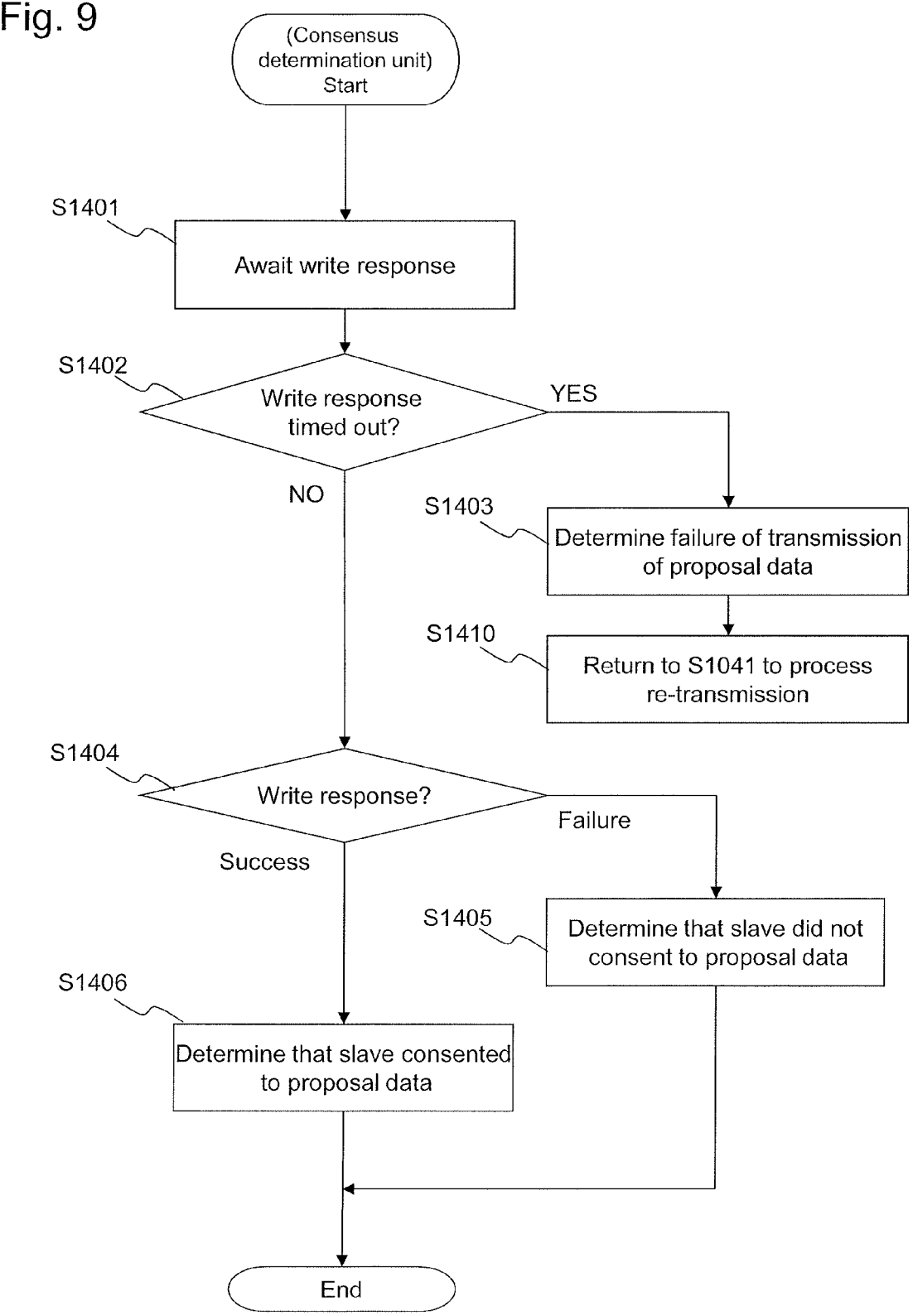
FIG. 9 is a flow chart showing details of a process example in which a consensus determination unit determines consent by one slave node.

FIG. 9 is a flow chart showing details of a process example in which the consensus determination unit 1443 determines consent by one slave node 100B. The present process corresponds to a process with respect to one slave node 100B of S1051 in FIG. 5.

The consensus determination unit 1443 waits for a write response with respect to an RDMA transfer to be sent back from the slave node 100B (S1401). For example, the consensus determination unit 1443 polls a completion queue managed by the RDMA I/F 150A of the master node 100A at regular intervals to determine whether or not a write response is stored. For example, when a write response is stored in the completion queue, the RDMA I/F 150A of the master node 100A performs an interrupt notification to that effect to the consensus determination unit 1443.

When a write response is not sent back and a timeout occurs (S1402: no), the consensus determination unit 1443 may execute the following process. Specifically, the consensus determination unit 1443 may determine that an RDMA transfer of proposal data to the slave node 100 has failed (S1403), return to S1041 shown in FIG. 5, and once again perform an RDMA transfer. A prescribed time until timeout may be configured by the manager in advance.

When a write response is sent back within the prescribed time (S1402: yes), the consensus determination unit 1443 executes the following process. Specifically, the consensus determination unit 1443 determines whether the write response is a write success response or a write failure response (S1404). For example, the consensus determination unit 1443 may check a result of execution of the RDMA transfer (a completion return status).

When the write response is a write failure response (S1404: failure), the consensus determination unit 1443 determines that the slave node 100B has not consented to the proposal data (S1405), and ends the present process. In the case of a write failure response, the result of execution of the RDMA transfer may be an access error to a memory area of the slave node 100B (a remote access error).

When the write response is a write success response (S1404: success), the consensus determination unit 1443 determines that the slave node 100 has consented to the proposal data (S1406), and ends the present process. In the case of a write success response, the result of execution of the RDMA transfer may be a success.

FIG. 10 is a flow chart showing details of a process example in which the success reception unit 1442 of the slave node 100B reflects proposal data. The present process corresponds to the process of S2091 in FIG. 5.

When the success reception unit 1442 of the slave node 100B receives a success notification from the master node 100A, the success reception unit 1442 executes the following process. The success reception unit 1442 acquires a record of which the sequence number 14451 matches a sequence number included in the received success notification (referred to as a "target record" in the description of FIG. 10) from the proposal number management table 1445 (S2221).

The success reception unit 1442 acquires proposal data from a memory area indicated by the R_KEY 14492 of the target record. Subsequently, the success reception unit 1442 reflects the acquired proposal data in the data storage unit 1441 of the slave node 100B (S2222).

The success reception unit 1442 deregisters the registration for RDMA of the memory area indicated by the R_KEY 14492 included in the target record. In addition, the success reception unit 1442 frees the memory area. A memory size that is freed at this point may be configured in advance by the manager or the like.

The success reception unit 1442 deletes the target record from the proposal number management table 1445 (S2224), and ends the present process. Accordingly, the proposal data on which a consensus has been built is reflected in all nodes.

In the description given above, a size of a memory area secured in the slave node 100B is configured in advance by the manager or the like. Alternatively, the size of the memory area may be automatically configured by a node. A process example thereof will be described below.

In the process of S101 shown in FIG. 5, the master node 100A transmits a prepare request in which a memory size has been added to a sequence number and a proposal number to the slave node 100B (S101).

Subsequently, in S2111 shown in FIG. 6, the prepare reception unit 1444 of the slave node 100B secures a new memory area based on the memory size included in the prepare request received from the master node 100A and registers the memory area for RDMA. In addition, the prepare reception unit 1444 acquires an R_KEY associated with the memory area.

Furthermore, in S2112 shown in FIG. 6, the prepare reception unit 1444 of the slave node 100B adds a record having the memory size included in the prepare request to the proposal number management table 1445.

Subsequently, in S2223 shown in FIG. 10, the success reception unit 1442 of the slave node 100B deregisters the registration for RDMA of the memory area indicated by the R_KEY of the target record acquired from the proposal number management table 1445 in S2221, and frees a memory area corresponding to the memory size included in the record. Accordingly, a memory area with an appropriate size is secured and efficiency of memory use can be improved.

It is to be understood that the embodiment described above is merely an example and that the scope of the present invention is not limited to the embodiment. It will be obvious to those skilled in the art that the present invention can be implemented in various other modes without departing from the spirit of the present invention. For example, the present invention can also be applied to a distributed computing system and a distributed processing method related to a distributed consensus algorithm other than Paxos such as ZAB described in NPL 3 and Raft described in NPL 4.

REFERENCE SIGNS LIST

100 Node
110 CPU
120 Storage device
130 Memory
144 In-memory KVS
150 RDMA I/F
180 Network I/F
170 Client

The invention claimed is:

1. A distributed computing system that reduces an amount of time required for the distributed computing system to reach a consensus, the system comprising:
   a first computer that includes:
      a first memory,
      a first communication interface that is communicatively coupled to a plurality of second computers via a network, and
      a first processor that is communicatively coupled to the first memory and the first memory;
   wherein the first processor is configured to:
      transmit, using the first communication interface, a prepare request to each of the plurality of second computers, wherein the prepare request is a request to prepare a proposal and includes a proposal ID,
      receive, using the first communication interface, a prepare response from at least one second computer from the plurality of second computers, wherein the prepare response includes a memory area ID that identifies a particular memory location of a second memory of each of the at least one second computer,
      receive, using the first communication interface, proposal data from a client,
      write, using the first communication interface, the proposal data to the particular memory location of the second memory of each of the at least one second computer,
      determine a number of instances where the write of the proposal data to the particular memory location of the second memory of each of the at least one second computer is successful,
      on a condition that the number of instances satisfies a prescribed quorum, transmit, using the first communication interface, a success notification to each of the at least one second computer;
   wherein in response to receiving the success notification, each respective second computer is configured to transfers the proposal data from the particular memory location of the second memory of the respective second computer to a storage device of the respective second computer.

2. The distributed computing system according to claim 1, wherein the first memory stores management information that indicates a correspondence between a sequence ID of a sequence of building the consensus, a respective proposal ID, and a respective memory area ID, and
   the prepare request includes a particular proposal ID and a particular sequence ID corresponding to the proposal.

3. The distributed computing system according to claim 2, wherein the second computer is further configured to:
   send back a failure response that indicates a failure of preparation to the first computer when the sequence ID in the prepare request received from the first computer exists wherein the prepare request and the proposal ID associated with the sequence ID existing in the management information indicates that the proposal is at least old as a previous proposal.

4. The distributed computing system according to claim 3, wherein the failure response the proposal ID associated with the sequence ID existing in the management information, and the first computer is further configured to:
   transmit, a new prepare request including a new proposal ID that is larger than the proposal ID included in the prepare response to the second computer, wherein the new prepare request is transmitted in response to the receiving the failure response.

5. The distributed computing system according to claim 3, wherein the second computer is further configured to:
update the management information by associating a new memory area ID with the proposal ID in the prepare request, and
send back a new prepare response including the proposal ID in the prepare request and the new memory area ID to the first computer when a result of a comparison between the proposal ID in the prepare request and the proposal ID associated with the sequence ID existing in the management information indicates that the proposal is newer than the previous proposal.

6. The distributed computing system according to claim 1, wherein
the first processor writes the proposal data to the particular memory location of the second memory of the second computer in accordance with RDMA (remote direct memory access).

7. A distributed processing method that reduces an amount of time required for a distributed computing system to reach a consensus, the method comprising:
transmitting, by a first processor of a first computer, a prepare request to a second computer via a first communication interface, wherein the prepare request is a request to prepare a proposal and includes a proposal ID,
receiving, by the first processor, a prepare response from the second computer via the first communication interface, wherein the prepare response includes a memory area ID that identifies a particular memory location of a second memory of the second computer,
receiving, by the first processor, proposal data from a client via the first communication interface,
writing, by the first processor, the proposal data to the particular memory location of the second memory using the first communication interface,
determining, by the first processor, a number of instances where the write of the proposal data to the particular memory location of the second memory of each of the at least one second computer is successful, and
on a condition that the number of instances satisfies a prescribed quorum, transmitting, by the first processor, a success notification to the second computer via the first communication interface,
wherein in response to receiving the success notification, the second computer transfers the proposal data from the particular memory location of the second memory to a storage device of the second computer.

* * * * *